Dec. 22, 1970        M. K. MUIR        3,549,254

OPTICAL SYSTEM

Filed Oct. 23, 1968        2 Sheets-Sheet 1

INVENTOR
MAX K. MUIR

Anderson, Luedeka, Fitch, Even & Tabin
ATTYS.

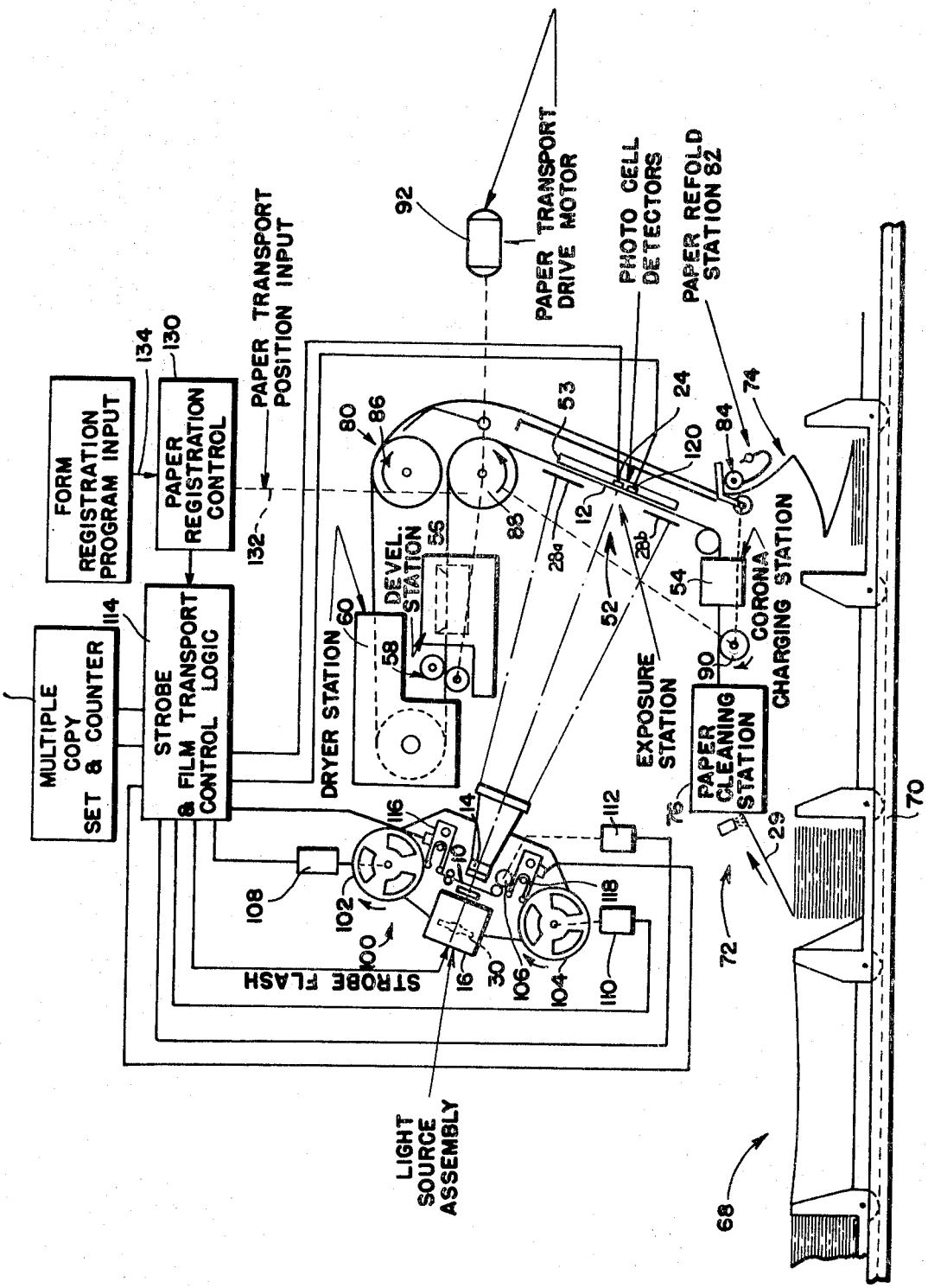

United States Patent Office 3,549,254
Patented Dec. 22, 1970

3,549,254
OPTICAL SYSTEM
Max K. Muir, San Diego, Calif., assignor to Stromberg Datagraphics, Inc., San Diego, Calif., a corporation of Delaware
Filed Oct. 23, 1968, Ser. No. 769,841
Int. Cl. G03b 27/32
U.S. Cl. 355—55             17 Claims

ABSTRACT OF THE DISCLOSURE

An optical system is described for projecting images from a photographic medium, such as unperforated microfilm, onto a photosensitive medium, and for projecting indicia from the photographic medium to permit registration of each image, through a single projection lens and without detrimentally affecting the photosensitive medium with the projected registration indicia. Apparatus which may employ such an optical system is also described.

---

The present invention relates to the printing of photographic images onto a photosensitive medium, and particularly to a light source and optical system for projecting and registering such images from unperforated strip microfilm onto a photosensitive medium for making enlarged copies thereof.

While general data and information storage techniques employing micro-sized photographic images, such as microfilm, are now well known, the practical use of such techniques presents certain difficulties in the retrieval and reproduction of the data, as well as in the provision for data output in a form convenient and well-adapted for its intended eventual use. Where there are large volumes of such data to be retrieved and reproduced into a more convenient form for handling, such as by conversion to some form of hard copy or paper output, it is desirable that printing apparatus for this purpose be capable of operation at extremely high speed, while providing consistent, high quality image reproduction. In certain applications it is desirable to employ a paper for print-out which is pre-printed with letterheads, invoice forms, or other fixed information and to add variable information from the microfilm thereto, so as to fill in the appropriate blanks in the preprinted forms.

In employing strip microfilm, which is typically stored on reels for convenience in handling, it may be necessary to register or align each image with a fixed frame of reference such as at an exposure station or projection gate, for controllably superimposing the image onto the photosensitive medium on which it is to be printed. Where the strip microfilm contains sprocket holes and is driven by a sprocket wheel, registration is generally accomplished by utilizing the sprocket wheel and sprocket holes to establish a known and controllable relationship between the driving mechanism and the microfilm whereby the location of the image with respect to the frame of reference is determined by the relative position of the mechanism. However, where a non-sprocketed or unperforated microfilm is employed, registration of each image may be accomplished by the use of a registration mark in the form of an optical stripe associated with each image frame, each of the marks being electro-optically sensed to provide the required registration information to the film-driving mechanism for aligning each microfilm image with respect to the frame of reference. But where a photosensitive medium is employed as the printout, serious difficulties may be presented by undesirable exposure or "fogging" of the photosensitive medium due to the illumination of the registration marks or stripes. While the light beam illuminating the registration marks may be partially isolated from the image by the use of masks in the film projector or at the exposure station, such masks must be precise, and hence, costly. Furthermore, isolation by masks is never complete, since some of the registration beam light spreads into the image areas of the film and the exposure station by diffusion and internal reflections in the film base, and by spurious reflections from numerous surfaces. Additionally, registration problems may arise due to the printing or exposure light source interacting with the electro-optically responsive registration system.

Accordingly, it is an object of the present invention to provide an improved optical system for providing projection and registration of images from a photographic medium onto an image plane.

It is a further object of the present invention to provide an optical system for registration and printing of enlarged photographic images onto a photosensitive medium through a single projection lens system.

It is still a further object of the present invention to provide an improved light source and optical system for a high speed electrophotographic printer for making enlarged copies from microfilm on a continuously moving hard copy medium.

Other objects and advantages of the present invention will be apparent from the following detailed description when considered in conjunction with the accompanying drawings, wherein:

FIG. 3 is a schematic representation of a printing apparatus employing the light source and optical system of FIG. 1.

Figure 1:
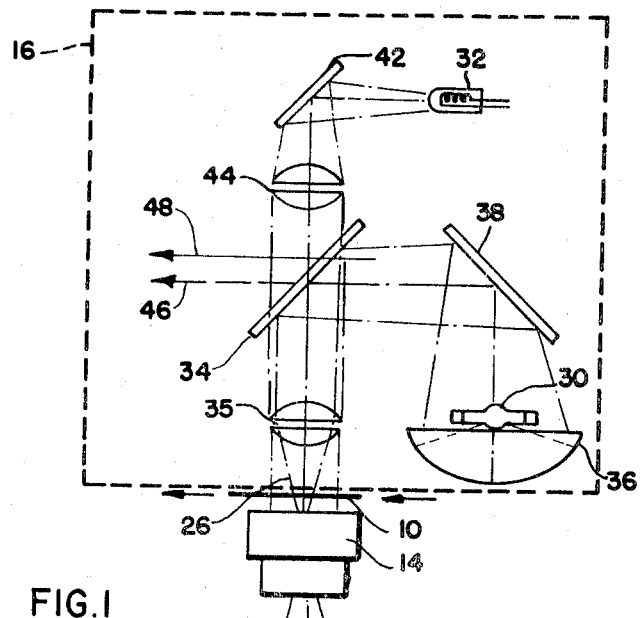
FIG. 1 is a diagrammatic representation of a preferred embodiment of the light source and optical system of the present invention.
Figure 2:
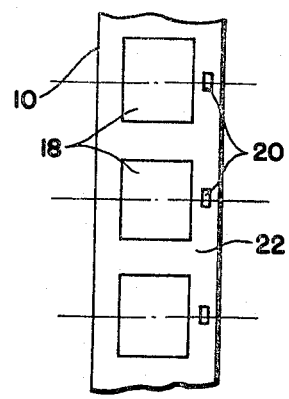
FIG. 2 is an elevational view of a segment of microfilm strip which may be advantageously employed in conjunction with the optical system of FIG. 1.

Referring now to FIG. 1, there is generally shown an optical system for projection images from a photographic medium, such as strip microfilm 10, onto an image plane 12 by means of a projection lens system 14 and a light source and optical assembly 16. The strip microfilm 10 preferably has a format as shown in FIG. 2, having image frames containing data or informational portions 18 and registration index marks 20 in the form of optical stripes along one border of the strip, each stripe being centered on the optical axis of each frame or data portion 18. The film 10 may have, for example, opaque images on a transparent background within each of the data frame portions 18 and transparent optical stripes on an opaque border generally indicated as 22. Other formats, however, may alternatively be employed, if simple changes are made in the printing apparatus, as will be obvious to those skilled in the art.

The light source and optical assembly 16 and the projection lens 14 provide an enlarged image of both the data frame 18 and the optical stripe 20 of each frame at the image plane 12, and the projected image of the optical stripe is detected by a suitable photosensor, such as a silicon photocell 24, located in the image plane 12 and disposed on the lateral optical axis of the projected data frame image (the lateral axis being normal to the direction of image motion), but laterally offset from the data image so as to be in the path of the projected image of the optical stripe. Consequently, the photosensor 24 detects the proper registration of the projected data frame image with respect to a fixed frame of reference in the image plane 12, defined in the illustrated embodiment by masks 28a and 28b. The proper registration of a projected image in the exposure station corresponds to, and is indicative of proper registration of a microfilm image in the projection gate 26. The registration photosensor 24, on receiving the projected registration stripe image, produces an electrical signal which may be employed to control the motion of the microfilm strip 10 by means of a suitable film transport and control circuit, to be hereinafter described, so as to cause the film 10 to stop with successive data frames 18 in correct registration, as above stated.

In accordance with the present embodiment of the invention, a photosensitive medium, such as a charge-sensitized electrophotographic paper 29, is disposed in the image plane 12, such paper having a given selective spectral response characteristic. The light source and optical assembly 16 comprises an intermittently illuminated exposure lamp 30, a continuously illuminated registration lamp 32, and an optical means 34, such as a dichroic mirror 34. The mirror 34 is reflective to the emitted radiation from the exposure lamp 30 and transmissive to the emitted radiation of the registration lamp 32, and forms a combined beam having a first component from the registration lamp 32 which has a spectral characteristic outside of the selective response characteristic of the photosensitive medium 29, and thus to which it is insensitive, and a second component from the exposure lamp 30 which is within the selective response characteristic of the photosensitive medium 29, and thus to which it is sensitive. The combined beam from the optical means 34 is passed through field lens 35 and the film image frame, the image of which is thus projected by projection lens 14 to the photosensitive medium 29 in the image plane 12. Consequently, the registration detecting photosensor 24 is responsive to the image of the registration portion or stripe 20 which is projected by the first component of the beam, while an image of the data portion 18 of the film projected by the second component of the projected beam exposes or otherwise affects the photosensitive medium 29. Any portion of the beam from the registration lamp which impinges on the image area of the photosensitive medium 29 is composed of spectral wavelengths outside the response spectrum of the material 29. Thus, image registration and projection from the unperforated microfilm 10 may be accomplished without detrimentally affecting the photosensitive medium 29 with the projected registration marks and without necessitating more than a single projection lens for both the informational or data portions 18 and the registration portions 20 of each image frame. Additionally, the employment of the registration photosensor 24 in the image plane rather than adjacent the projection gate 26 provides extremely good precision in the image registration operation since the photosensor is responsive to the registration index marks or stripes as enlarged by the magnification effect of the projection lens 14, and though the projected registration mark images may overlap or "spill over" somewhat onto the image area of the image plane 12, and consequently onto the image portion of the photosensitive medium 29, it is of no consequence because of the non-responsive nature of the photosensitive medium to the spectral characteristic of the registration source radiation.

More particularly, the light source and optical assembly 16 emits a combined beam wherein one component is red and infrared radiation from the registration lamp 32, which is preferably of the tungsten filament type, and the second component is composed of blue and ultraviolet radiation from the exposure lamp 30, preferably of the xenon strobe type. The photosensitive medium 29 in the image plane 12 is, in accordance with the present embodiment, a zinc-oxide coated electrophotographic paper web which has been sensitized by having a corona charge placed thereon in a manner well known in the electrostatic copying art. The paper web 29 is responsive to photon bombardment in the blue and ultraviolet range which thus discharges the paper in the exposed areas, forming a latent electrostatic image thereon corresponding to the data frame portions 18 of the microfilm 10. However, although the zinc-oxide coated paper has a response characteristic which is sensitive to ultraviolet and blue radiation, it is not sensitive to red and infrared radiation.

The registration photosensor 24 is preferably a photocell of the silicon type, and is substantially more sensitive to infrared than to either ultraviolet or blue light. The tungsten filament infrared lamp 32 is maintained continuously illuminated as the microfilm 10 is moved past the projection gate 26 so that the response of the registration photosensor 24 to the correct alignment or registration position of each image frame may be detected, and a suitable signal provided to cause the microfilm 10 to be stopped, as previously mentioned. The data frame 18 may then be exposed onto the charge-sensitized electrophotographic paper 29 by the flashing of the strobe 30 which emits an extremely intense flash of light for an extremely short duration, such as for a period less than 100 microseconds. The radiation from both the registration lamp 32 and the exposure strobe 30 are combined into a single, but variable, beam by the dichroic mirror 34 which has the property of being transparent to red and infrared radiation and reflective to ultraviolet and blue radiation. The dichroic mirror 34 will be described in greater detail hereinafter.

The strobe 30 is mounted in an elliptical reflector 36 which collects, redirects and generally focuses the light beam toward a point beyond the projection gate 26, after being reflected first from a planar mirror 38 disposed at a 45° angle to the incident central ray of the light beam, and then from the dichroic mirror 34. The planar mirror 38 reflects the beam to the front surface of the dichroic mirror 34 which is disposed at a 45° angle to the incident beam and 90° to the plane of the mirror 38 so that the beam of light is now folded through an angle of 180° as it is reflected from the dichroic mirror 34 to field lens 35, and thence through the projection gate 26 and projection lens 14 to the image plane 12. The infrared lamp 32 is located behind the dichroic mirror 34 and forms essentially a point source of infrared radiation which is incident on a planar mirror 42, positioned at a 45° angle to the incident central ray of the infrared beam and parallel to the plane of the dichroic mirror 34 so as to reflect the infrared radiation through an angle of 90°. The radiation is then passed through a condenser lens 44 which forms the radiation into a parallel beam, through the dichroic mirror 34, and thence through the field lens 35 which converges the beam through the projection gate 96 to the projection lens 14.

In accordance with the illustrated embodiment, the strobe lamp 30 is not continuously illuminated, but is flashed when an image frame of the microfilm 10 is registered within the projection gate 26 and when the sensitized electrophotographic paper 29 is properly registered between the masks 28a and 28b with respect to any particular portion thereof. Thus, the combined beam from the light source and optical assembly 16 projects the first or red/infrared component continuously, while the second or blue/ultraviolet component is added intermittently.

With this light source and optical arrangement, continuous registration operation is permitted without discharging the electrostatic charge which has been placed on the electrophotographic paper, and any ultraviolet or blue components in the radiation emission of the registration lamp 32 are reflected out of the optical path by the dichroic mirror 34, as indicated by the dotted arrow 46, so that they cannot affect the electrophotographic paper 29. In addition, any red or infrared components in the beam of the strobe 30 are transmitted through the dichroic mirror 34, as indicated by the solid arrow 48, and thus pass harmlessly out of the optical path of the projected beam so that the microfilm 10 is prevented from receiving radiation or heat energy (normally in the infrared spectral range) which is generally produced by the intense flash. While the infrared radiation from the registration lamp 32 is normally of relatively low intensity so as not to significantly affect the temperature of the microfilm, the extremely high intensity of the strobe flash might well generate sufficient heat to raise the temperature of the microfilm during the exposure operation if exposure were repeated at a rapid rate for high speed printing, of multiple copies. The transmission of the infrared radiation through the dichroic mirror 34, as described, materially aids in preventing the temperature of the microfilm from becoming excessive. The transmission of infrared radiation through the dichroic mirror 34 also prevents the intense flash of the lamp 30 from disturbing the circuits controlled by photocell 24. The photocell may be covered with a filter which passes only infrared energy, if desired, to prevent disturbance by the ultraviolet flash, although this is usually not necessary.

The dichroic mirror 34, which is sometimes described as a reflection interference filter, may comprise a number of layers of dielectric film on a substrate of transparent material, such as glass. The adjacent dielectric layers alternate between films of high refractive index and films of low refractive index, each layer or film being very thin and being carefully controlled to a thickness of a quarter of the wavelength of the light to be reflected. Thus, due to interference effects, light of the selected wavelengths striking the dielectric mirror is reflected, while light of a significantly different wavelength is transmitted through the mirror. Although a mirror having only one pair of such quarter-wavelength layers will reflect only light within a narrow band of wavelengths, the reflection spectrum is increased by employment of a greater number of quarter-wavelength layers superimposed so that the layers in sequence have alternate high and low refractive indices.

In accordance with the illustrated embodiment of the invention, the dichroic mirror 34 has a reflection characteristic of high efficiency (i.e., a reflectivity greater than 90%) for light throughout the blue and ultraviolet part of the spectrum. Also, the mirror 34 has a high transmission efficiency (i.e., a transmissivity greater than 90%) throughout the yellow, red, and infrared portions of the spectrum. Such a dielectric mirror may typically have adjacent layers of a thickness less than .00006 inch, employing nine such layers of solid dielectric material having refractive indices greater than 1.0, and may be made by vacuum depositing alternate quarter-wavelength layers of, first zinc sulfide, and then magnesium fluoride onto the glass substrate. The substrate is placed in a vacuum chamber with a quantity of the dielectric material to be deposited in a refractory boat. The boat is then heated by an adjacent tungsten coil to evaporate the dielectric, the vapor from which condenses on the cooler surfaces of the glass, or on the previous dielectric layers already deposited. An final layer of silicon monoxide may then be deposited as a protective overcoating. Such a dichroic mirror is approximately twice as efficient as conventional half-silvered or partially reflecting mirrors, which might pass 45% and reflect 45% of the light incident thereto.

The deposited thickness of the layers, the number of layers employed, and the refractive indices of the layers substantially determine the transmission/reflection characteristics of the dichroic mirror as a function of wavelength. The transmission/reflection characteristics of the dichroic mirror are also a function of the angle of incidence of the radiation, and in the illustrated embodiment, the dichroic mirror is disposed at an angle of approximately 45° to both the red/infrared and blue/ultraviolet light. The design techniques for dichroic mirrors are generally known, and both analytic and iterative approximation design methods have been developed which enable the design of such mirrors from specified transmission/reflection characteristics. Such design techniques, for example, are discussed in detail in the Journal of the Optical Society of America, volume 48, No. 12, December 1958, pages 955–957, and in the same journal, volume 49, No. 2, February 1959, pages 126–130. One satisfactory dichroic mirror which may be employed in the illustrated embodiment, is number 45–2–500, available from Bausch and Lomb, Inc.

The exposure lamp or strobe 30 is desirably mounted in a position approximately at one focus of an ellipsoid of which a portion is formed by the strobe reflector 36. The reflective surface of the ellipsoidal reflector 36 thus has the geometric property that the normal to any point on the surface bisects the angle formed between lines drawn from that point to each of the two focii of the ellipsoid. Since the angle of incidence equals the angle of reflection, as measured from the normal to the surface at a point thereon, the light (being considered as rays) emanating from the strobe 30 positioned at one focus of the ellipsoid is necessarily reflected from the ellipsoidal surface toward the other focus thereof. The components of the ellipsoidal system are therefore spaced along the major axis of the ellipsoid so that the other focus of the reflector is effectively beyond the film gate a sufficient distance so that the beam completely fills the gate and illuminates the entire microfilm image frame positioned therein. Since the beam is convergent, its cross section at the aperture of the projection lens 14 is less than the opening in the gate 26. The projection lens aperture is made greater than the beam cross section impinging thereon, so that substantially all the light impinging thereon is transmitted through the lens. It is to be understood that the optical path corresponding to the major axis of the ellipsoid in FIG. 1 is folded by the 45° mirrors 38 and 34, but the folding of the path has no effect upon the operation of the ellipsoidal system. The focusing property of the ellipsoidal reflector 36 generally eliminates the necessity for a strong condenser lens in the optical path of the strobe 30, which reduces condenser losses and improves efficiency.

One alternative configuration of the light source and optical assembly 16 which may be employed is an arrangement having the positions of the two lamps 30 and 32 interchanged and utilizing a dichroic mirror which reflects the registration beam and transmits the exposure beam.

The optical system in accordance with the present embodiment of the invention, is advantageously employed in a high speed printing apparatus, illustrated schematically in FIG. 3, for printing one or more copies of microfilm images on electrophotographic paper, although it may also be employed advantageously in other types of apparatus or applications. As shown in FIG. 3, apparatus is provided for printing the images from a photographic film medium, such as reels of microfilm 10, onto a photosensitive or electrophotographic hard copy medium 29, such as zinc oxide coated paper, at high speeds by means of the light source and optical system 16 and the projection optics 14 which projects enlarged images from the microfilm 10 to the paper 29 at an exposure station 52. The exposure station 52 has a reference frame defined by the masks 28a and 28b adjacent the image plane and which form an exposure window therefor. A vacuum platen 53 is disposed normal to the axis of the projection optics and maintains the paper 29 substantially wrinkle free as it passes thereover, as well as preventing the paper from flapping.

An electrostatic processing system is shown comprising a corona charging station 54 which sensitizes the paper 29 prior to exposure, a developer station 56 of any suitable type for developing the latent images on the paper, a pair of squeegee rollers 58 which squeeze the excess developer liquid from the paper as it passes therebetween, and a dryer station 60 which dries the paper. The paper is in the form of fan-folded stacks having tear-perforations coinciding with each fold and marginal sprocket holes along each edge. A system or train of carts 68 is provided which travel along suitable tracks or guides 70 and are adapted to respectively deliver and receive stacks of the fan-folded electrophotographic paper at input and output stations 72 and 74, respectively, of the apparatus, in a continuous fashion as the printing operation progresses. The carts may be tandemly coupled together, and the stacks of paper in the loading carts to be fed to the printer may be spliced together so that an unlimted volume of paper can be fed therethrough in a continuous fashion and without necessitating any stoppage thereof, the carts 68 being shifted to the right (as illustrated in FIG. 3) after each loading cart has been emptied.

The paper passes from the particular cart in the loading station 72 through a vacuum cleaning station 76 which removes any dust from the paper before it reaches the corona charging station 54. The paper is then fed continuously at a constant speed by means of a paper transport assembly, generally indicated as 80, through the corona charging station 54, the exposure station 52, developer station 56 and squeegee rollers 58, dryer station 60, and through a paper refold station 82 which refolds the paper and stacks it in the receiving cart located at the receiving station 74. When each fan-fold crease passes over the lower end of the refold station 82, past paper drive wheels 84, the weight of the paper sheet itself, causes it to bend at each fold, and in this manner the paper refolds at its original creases as it is stacked in the receiving cart.

The paper transport 80 comprises three sets of pinwheel assemblies 86, 88 and 90 which engage the sprocket holes in the paper web 29, and thereby synchronously drive it through each of the stations of the apparatus. The pinwheels, squeegee rollers and paper drive wheels are driven by a motor 92 mechanically coupled thereto by any suitable means, indicated by interconnected dotted lines.

A film transport 100 is provided for moving the microfilm 10 from one image to another, such as in a successive manner, intermittently, so that each film image frame is maintained stationary during the exposure on the continuously moving paper web 29 by the stroke or flash lamp 30 which provides a short duration or "fast" image exposure at the exposure station 52. The film transport 100 will then move the film 10 to another image frame while the strobe 30 is off. The film transport 100 has supply and take-up reels 102 and 104, respectively, and a film driving capstan 106 about which the film 10 is wrapped. Each of the reels and the capstan are driven by separate servo motors 108, 110 and 112, as shown, which are controlled by the control logic 114. Vacuum buffer columns 116 and 118, each having a suitable loop sensing device, are respectively provided, as shown, adjacent the supply and take-up reels, the sensing devices being coupled back to the control logic 114 for appropriate reel motor operation.

The registration of each projected image in the exposure station 52 is generally accomplished by the registration photosensor 24, which supplies a suitable signal to the control logic 114 in response to the registration mark image, causing the transport 100 to stop the film motion. Additionally, a further photosensor 120 may be provided below the registration photosensor 24 so as to receive the projected optical stripe image prior to the registration photosensor, and this advance signal so generated is also supplied to the control logic 114. This signal causes the speed of the microfilm 10 to be reduced sufficiently to lower the film transport's momentum so that upon detection of the registration mark image by the registration photosensor 24, the film will come to rest within the permitted tolerance for correct image registration within the exposure station 52.

The projected images from the microfilm are inverted by the projection lens 14, so that although the film travels downward on the transport (as shown in FIG. 3), the images travel upward at the exposure station.

Figure 4:
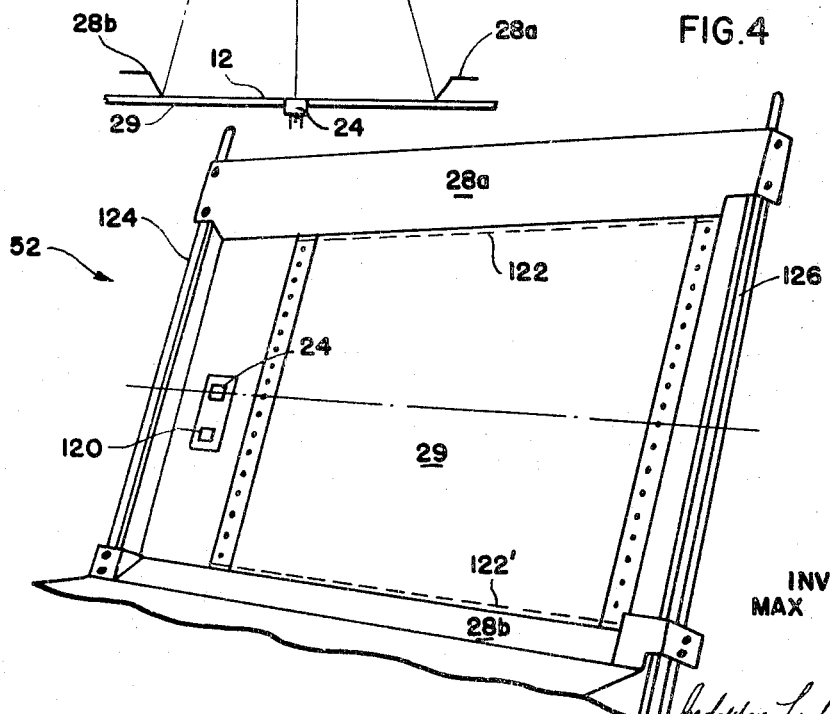
FIG. 4 is a perspective view of the exposure station of the printing apparatus of FIG. 3.

Referring now to FIG. 4, there is shown a perspective view of the exposure station 52. The folds or lateral tearperforations 122, 122', etc., in the paper 29 define a plurality of predetermined portions or sections thereof which are each moved substantially instantaneously through a reference or registration position where it receives a projected stationary image from the microfilm 10. Each of these portions of the paper may, if desired, have a pre-printed form or letter format thereon; alternatively, these portions of the paper may merely be blank. The photosensors 24 and 120 are disposed beyond the left edge of the paper path, but in the path of the projected registration stripes as illuminated by the infrared portion of the projection beam. Exposure masks 28a and 28b define the exposure window, as previously mentioned, and are positioned by sliding them up or down on support or guide rods 124 and 126 so that they are equally spaced a short distance from successive perforations, 122, 122', etc., for any particular form length.

In a particular construction of the present apparatus, the exposure masks are formed of sheet metal and the support rods or guides are formed from steel rods about ½ inch in diameter. Each sheet metal mask has a brass block fastened to each end with two screws, and each block has a ½ inch bore to slideably receive the guide rod.

Referring again to FIG. 3, a paper registration control means 130 is provided for actuating or flashing the stroke 30 only when such a predetermined portion or form of the moving electrophotographic paper 29 is registered or aligned in the exposure window of the exposure station 52 to properly receive the projected stationary image from the microfilm 10. The registration control means 130 is responsive to the positional orientation of the paper transport 80, and thus to the paper position, by means of a mechanical coupling to the pinwheel assemblies, represented by dotted line 132, and to a form registration program input 134 which provides the necessary form-length information, so that the paper registration control 130 provides an output signal indication to the control logic 114 as each form portion is correctly registered in the exposure station 52. The registration program or information for various form lengths may be supplied for any particular paper form-length used, and such program may be in the form of a perforated closed loop or tape used in conjunction with a program tape reader, for example, as described in copending application of Dietz et al., S.N. 771,077, filed Oct. 28, 1968, and assigned to the assignee hereof. The strobe and film transport control logic 114 is responsive to the output of the paper registration control 130 and to the image registration detecting photosensor 24 for flashing the stroke 30 on the occurrence of the registration of a predetermined form portion of the continuously moving paper 29 in the exposure station 52 while the stationary projected film image is also registered therein, the signal from the photosensor 24 serving to enable the logic 114 so as to respond to the paper registration control output.

One or more copies of each microfilm image may be made automatically by means of a multiple copy set and counter circuit 136 which is coupled to the control logic. By suitable preselection of the desired number of copies of each microfilm image frame, e.g., by means of a selector switch (not shown), the film transport maintains the film stationary until the preselected number of exposures have been completed, each on a successive form portion of the paper 29, after which the film transport 100 moves the microfilm 10 to the next image frame, and so on. Any suitable form of logic to perform the indicated functions may be utilized, the design of such logic circuitry, per se, being within the skill of the art based on the teachings hereof.

Thus, there has been described a light source and optical system for projecting images for reproduction on a photosensitive medium and for projecting indicia permitting registration of each image to be reproduced, through a single projection lens and without detrimentally affecting the photosensitive medium with the projected registration indicia. The optical system in accordance with the invention in its broader aspects may be utilized in various apparatus, such as, for example, in the printing of multiple superimposed images in precise registration with each other, or in the viewing of registered images on a screen disposed in the image plane.

Although a preferred embodiment of the present invention has been illustrated and described, various modifications thereof will be apparent to those skilled in the art, and accordingly, the scope of the present invention should be defined only by the appended claims, and equivalents thereof.

Various features of the invention are set forth in the following claims.

What is claimed is:

1. An optical system for projecting an image from a photographic medium onto a photosensitive medium having a given selective spectral response characteristic, the image on said photographic medium having a data portion to be printed and an indica portion of permitting the image to be registered within a given frame of reference, said system comprising an exposure lamp and a registration lamp, a projection lens for projecting the image from the photographic medium to the photosensitive medium in response to illumination from said lamps, and optical means interposed between said lamps and said projection lens for forming a combined beam for image projection having a first component from said registration lamp which has a spectral characteristic outside of said selective response characteristic of the photosensitive medium and a second component from said exposure lamp which has a spectral characteristic within said selective response characteristic of the photosensitive medium for printing the data portion of the image thereon, whereby the image may be registered by detection of the projected indicia portion thereof without affecting the photosensitive medium.

2. The system of claim 1 wherein said exposure and registration lamps have overlapping spectral characteristics, and said optical means comprises means for precluding the radiation of said registration lamp within said given selective spectral response characteristic from said combined beam.

3. The system of claim 2 wherein said optical means comprises means for precluding the radiation of said exposure lamp having the spectral characteristic of said first beam component from said combined beam.

4. The system of claim 1 wherein said optical means includes a dichroic mirror positioned to receive the radiation from said exposure lamp on one face thereof for reflecting said second beam component to said projection lens and to receive the radiation from said registration lamp on the opposite face thereof for transmitting said first beam component therethrough to said projection lens.

5. The system of claim 4 wherein said first beam component has an infrared spectral characteristic from said registration lamp and said second beam component has a spectral characteristic in the visible and ultraviolet range from said exposure lamp.

6. The system of claim 5 wherein said registration lamp has a continuous principal emission and said exposure lamp comprises a strobe adapted to be intermittently flashed.

7. The system of claim 1 wherein said registration lamp provides said first beam component from said optical means continuously, and said exposure lamp provides said second beam component from said optical means intermittently.

8. The system of claim 4 wherein said dichroic mirror is disposed at an angle of approximately 45° to the incident central ray from each of said lamps and at an angle of approximately 45° to the central ray of said combined beam from said mirror.

9. The system of claim 1 further comprising an ellipsoidal reflector disposed in proximity to said exposure lamp, said exposure lamp being positioned approximately at one focus of said reflector and spaced from said projection lens so that the other focus of said reflector is positioned beyond the aperture of projection lens, the light therefrom being directed toward said other focus and the greater part of the reflected light passing through said lens aperture.

10. Apparatus including the optical system of claim 1 comprising registration detecting means responsive to the indicia portion of said image as illuminated by said first component of said beam to provide an output signal indicative of image registration, and transport means for moving said photographic medium through the combined beam extending from said optical means to the aperture of said projection lens, said transport means being responsive to said output signal to stop the motion of said photographic medium on the occurrence thereof.

11. The apparatus of claim 10 wherein said registration detecting means is disposed substantially in the same plane as the photosensitive medium, said plane being spaced from said projection lens so that an enlarged version of the image is projected thereon.

12. The apparatus of claim 10 wherein said optical means includes a dichroic mirror positioned to receive the radiation from said exposure lamp on one face thereof for reflecting said second beam component to said projection lens and to receive the radiation from said registration lamp on the opposite face thereof for transmitting said first beam component therethrough to said projection lens, means for maintaining said registration lamp continuously illuminated to provide projection of said indicia associated with each of a plurality of images onto the plane of the photographic medium, means responsive to each detecting means output signal for intermittently moving each of said images into registration for exposure, said exposure lamp comprising a strobe flash lamp, and means for flashing said strobe to expose each of said successively registered images onto the photosensitive medium.

13. The apparatus of claim 12 wherein the photographic medium is in the form of unperforated strip microfilm and the photosensitive medium is in the form of a continuously moving web of charge-sensitized electrophotographic paper.

14. An optical system for projecting an image from a photographic medium onto an image plane, the image on said photographic medium having a data portion and an indicia portion, said system comprising first and second lamps, a projection lens for projecting the image from the photographic medium to the image plane in response to illumination from said lamps, and optical means interposed between said lamps and said projection lens for forming a combined beam for image projection having a first component from one of said lamps which has one spectral characteristic and a second component from the other of said lamps which has a second and different spectral characteristic, said optical means comprising means for precluding any radiation of said one lamp within said second spectrum from said combined beam, whereby the projected data portion and indicia portion at the image plane may be separated and employed for different functions.

15. The system of claim 14 wherein said optical means comprises a dichroic mirror.

16. The system of claim 1 wherein said optical means includes a dichroic mirror positioned to receive the radiation from said exposure lamp on one face thereof for transmitting said second beam component therethrough to said projection lens, and to receive the radiation from said registration lamp on the opposite face thereof for reflecting said first beam component to said projection lens.

17. The apparatus of claim 10 wherein said optical means includes a dichroic mirror positioned to receive the radiation from said exposure lamp on one face thereof for transmitting said second beam component to said projection lens and to receive the radiation from said registration lamp on the opposite face thereof for reflecting said first beam component therefrom to said projection lens, means for maintaining said registration lamp continuously illuminated to provide projection of said indicia associated with each of a plurality of images onto the plane of the photographic medium, means responsive to each detecting means output signal for intermittently moving each of said images into registration for exposure, said exposure lamp comprising a strobe flash lamp, and means for flashing said strobe to expose each of said successively registered images onto the photosensitive medium.

References Cited

UNITED STATES PATENTS 2,563,892  8/1951  Waller et al. _____ 352—70

JOHN M. HORAN, Primary Examiner

R. A. WINTERCORN, Assistant Examiner

U.S. Cl. X.R.

352—70, 92; 355—61; 356—172